March 30, 1954 L. REICHOLD 2,673,516
TOASTER
Filed Sept. 16, 1950
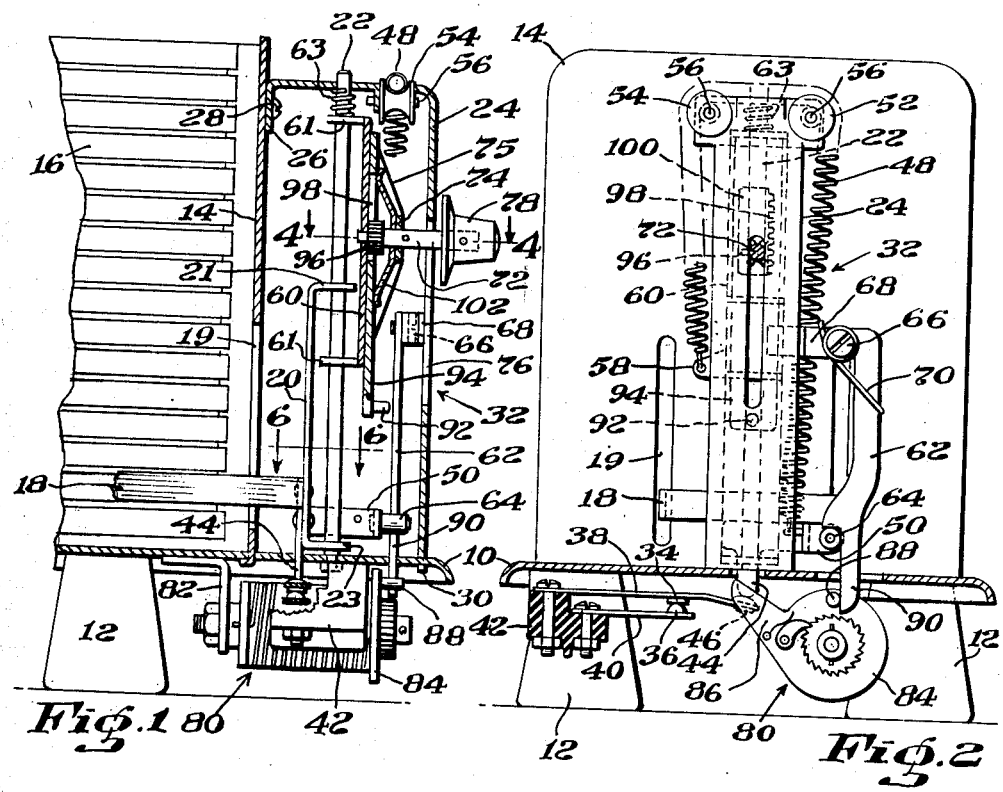
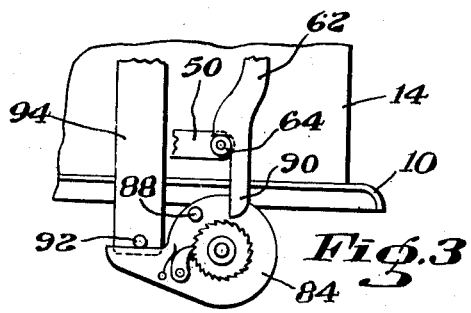
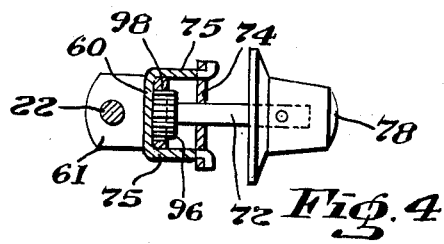
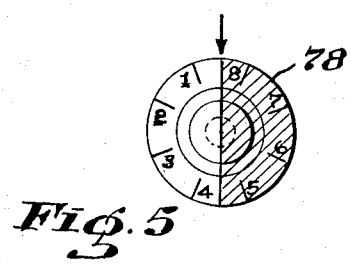
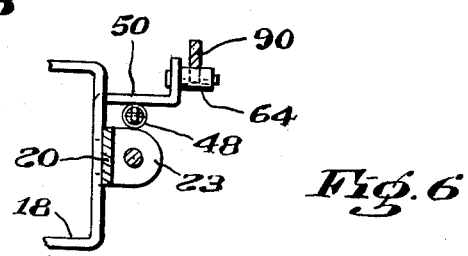
INVENTOR.
Ludwig Reichold
BY
J. Stanley Churchill
ATTORNEY Patented Mar. 30, 1954

2,673,516

UNITED STATES PATENT OFFICE 2,673,516

TOASTER

Ludwig Reichold, Simsbury, Conn.

Application September 16, 1950, Serial No. 185,211

3 Claims. (Cl. 99—327)

This invention relates to an automatic bread toaster.

The invention has for an object to provide a novel and improved automatic bread toaster provided with a timing mechanism and having control mechanism of simple and novel structure for setting the timer to vary the time of toasting in a novel and efficient manner.

Another object of the invention is to provide a novel and improved automatic bread toaster of the character specified of novel construction, which may be economically manufactured, and which is highly efficient in operation.

With these general objects in view, and such others as may hereinafter appear, the invention consists in the automatic bread toaster and in the various structures, arrangements and combinations of parts hereinafter described and particularly defined in the claims at the end of this specification.

In general, the present invention contemplates an automatic electric bread toaster having provision for manually depressing the bread carrier and latching the same in toasting position, the depression of the carrier effecting closing of the electrical circuit for toasting the bread and also effecting winding up and setting of a mechanical timing mechanism arranged to release the latch to permit the bread carrier to be automatically elevated into non-toasting position and to effect opening of the electrical circuit after a predetermined time interval. The present invention contemplates novel adjustable control mechanism for conveniently varying the setting of the timing mechanism to effect release of the bread carrier at different time intervals, the control mechanism being adjusted according to the degree of crispness or color desired for the toast. In the illustrated embodiment of the invention, the control mechanism includes an adjustable element arranged to engage and wind up the timing mechanism when the bread carrier is depressed to toasting position and includes means for varying the position of initial engagement of the adjustable element with the timing mechanism whereby to vary the winding movement for the desired time interval. Certain novel constructional features conducive to simplicity of operation and to economy of manufacture are also embodied in the present automatic bread toaster, as will be hereinafter more fully described.

In the drawings illustrating the preferred embodiment of the invention, Fig. 1 is a side elevation in cross section of one end of the present toaster showing a sufficient portion thereof to enable the invention to be understood; Fig. 2 is an end view of the same; Fig. 3 is a view similar to Fig. 2 showing the parts in a different position of operation; Fig. 4 is a plan view detail in cross section taken on the line 4—4 of Fig. 1; Fig. 5 is a front view detail of the control knob; and Fig. 6 is a plan view in cross section taken on the line 6—6 of Fig. 1.

Referring now to the drawings, only a sufficient portion of the present automatic toaster is herein illustrated to enable the present invention to be understood, and as herein shown, 10 represents the base plate of a conventional two-slice electric automatic toaster mounted upon insulating legs 12, the base plate being arranged to support end frames 14 between which the usual electric heating elements 16 are carried for performing the toasting operation. A bread carrier, indicated generally at 18 is mounted for vertical reciprocation in the usual bread compartments, and as herein shown, the bread carrier is extended through elongated vertical slots 19 in the end frame 14 and supported at its ends upon vertical carrier supports 20 having their ends 21 bent laterally and provided with openings arranged to slidingly engage upright supporting rods 22 secured at their lower ends to the base plate 10. The upper ends of the supporting rods 22 may be extended through and supported in openings formed in the horizontal leg of a right angle bracket 24 having a depending tab 26 secured to the end frame 14 by screws 28. The vertical leg of the right angle bracket 24 may be provided with tabs 30 at its lower end which are received in slots formed in the base plate 10 to secure the bracket thereto. While the present drawings illustrate only one end of the electric toaster and bread carrier structure thus far described, it will be understood that similar supporting and vertically reciprocating structure may be provided at the other end of the toaster, the present invention relating more particularly to the timer control mechanism indicated generally at 32, to be hereinafter described.

The heating elements 16 may be provided with electric current through the usual connections, and as herein shown, include a pair of normally separated contacts 34, 36 mounted on leaf springs 38, 40 respectively attached in vertically spaced relation to an insulating support bracket 42 mounted on the underside of the base plate 10. As herein shown, the upper contact 34 is arranged to be yieldingly depressed into engagement with the lower contact 36 by a depending leg portion 44 carried by the carrier support 20, the leg 44 engaging the insulated end 46 of the upper leaf spring 38 whereby to automatically close the circuit to the heating elements 16 when the carrier is moved into toasting position.

The bread carrier 18 is normally urged upwardly into non-toasting position by an elongated spring 48 connected at one end to a latch arm 50 laterally extended from and secured to the lower end of the carrier support 20, the laterally extended arm 50 being preferably formed integrally with the depending leg 44, as illustrated. The elongated spring 48 is preferably looped and arranged to run over guide pulleys 52, 54 rotatably mounted on pins 56 supported in the upper end of the right angle bracket 24, and the other end of the spring may and preferably will be connected to a laterally extended arm 58 of an operating member 60, to be described.

Provision is made for latching the bread carrier 18 in its depressed or toasting position, and as herein shown, an elongated latch member 62 pivoted at its upper end is arranged to cooperate with a roller 64 carried by the laterally extended latch arm 50. The pivoted end of the latch member 62 is supported on a stud 66 carrier by an offset bracket 68 attached to the inner face of the support bracket 24, and the latch member is urged in a clockwise direction into latching position by a spring 70 coiled about the stud, one end of the spring being hooked over the bracket 68 and the other end bearing against the latch member, as shown.

The bread carrier 18 is arranged to be manually depressed into its latched position by engagement of the vertically reciprocal operating member 60 which as herein shown is provided with a laterally extended control shaft 72 rotatably mounted therein, the stud being further supported in a bearing member 74 extended across and secured to the outer ends of outwardly bent side wall portions 75 of the operating member 60. The control shaft 72 is arranged to extend through an elongated slot 76 formed in the support bracket 24 to permit vertical reciprocation, and the outer end of the shaft is provided with a control or time setting knob 78 fast thereon. The operating member 60 may be similar in construction to the carrier support member 20, the member 60 having corresponding ends 61 bent laterally and provided with openings arranged to slidingly engage the upright supporting rod 22. The ends 61 of the operating member 60 are arranged to straddle the upper end 21 of the carrier support 20 so that in operation when the operating member 60 is manually depressed by pushing down on the knob 78 the upper end 61 of the member 60 will engage the upper end 21 of the carrier support to slide the latter down into latched position, as illustrated in Fig. 3. It will be observed that during the depressing and latching operation the spring 48 common to both the carrier support and the operating member will be extended and after the latching operation is completed the operating member 60 and associated mechanism will be automatically returned to its initial position, as shown in Fig. 1, by retraction of the spring, the spring remaining partially loaded to effect elevation of the bread carrier upon release of the latch member 62. A spring 63 coiled about the rod 22 and interposed between the underside of the support bracket 24 and the upper end 61 of the operating member 60 may be provided to serve as a shock absorber upon return of the member 60 to its initial position.

The timing mechanism, indicated generally at 80 may be secured to the underside of the base member 10 by a support bracket 82, as shown, and may comprise a novel mechanically operated timing mechanism forming the subject matter of a copending application, it therefore being thought unnecessary to describe the same in detail in the present application. As herein shown, the timing mechanism 80 is provided with a disk 84 having a radially extended arm 86 arranged to be engaged to rotate the disk in a counterclockwise direction to effect winding or loading of the timer mechanism. The disk 84 is further provided with a pin 88 extended laterally therefrom arranged to engage an extended portion 90 of the latch member 62 to effect disengagement of the latch and release of the bread carrier when the timer mechanism unwinds in a clockwise direction.

The timing mechanism 80 may be arranged to unwind at a predetermined and substantially uniform rate, the time interval elapsed to effect disengagement of the latch member 62 being adapted to be varied by varying the distance of arcuate winding movement of the disk 84. As herein shown, in order to effect winding or loading of the timing mechanism, the arm 86 is arranged to be engaged by a pin 92 supported in a vertical bar 94 carried by and movable with the timer control and operating member 60, so that in operation, when the operating member 60 is pushed down to latch the bread carrier into bread toasting position, the timing mechanism is simultaneously loaded to effect release of the bread carrier after a predetermined time interval. The control bar 94 is mounted for vertical adjustment in the operating member 60 in order to vary the point of initial engagement of the pin 92 with the arm 86 and thus vary the extent of winding movement of the timing mechanism, it being understood that the extent of depressing movement of the member 60 and bread carrier is limited by engagement of the lower end 23 of the support 20 with the base member 10, as shown, in which position the latch member 62 is effective to engage the roller 64. The bar 94 is guided vertically between the marginal side walls 75 of the member 60 to prevent lateral displacement thereof, and is arranged to be adjusted vertically relative to its support by a pinion 96 fast on the control shaft 72 arranged to mesh with rack teeth 98 formed in one side defining the edge of a cutout portion 100 of the bar 94, so that rotation of the control knob 78 will effect raising or lowering of the bar. The bar is frictionally and resiliently retained in its adjusted position by a two-armed leaf spring 102 carried by the control shaft 72, the central portion of the spring bearing against the bearing member 74 and the two arms of the spring being bent and curved to engage and retain the bar against the face of the operating member 60, as shown.

From the above description it will be observed that by rotating the control knob 78 the control bar 94 may be moved up or down relative to the vertically reciprocal operating member 60 to vary the position of the pin 92 relative to the winding arm 86 thus varying the point of initial engagement of the pin with the arm when the control mechanism is depressed to set the timer and to latch the bread carrier in bread toasting position. By thus varying the position of initial engagement of the pin 92 with the winding arm 86, the extent of unwinding movement of the timing mechanism 80 may be varied by changing the arcuate distance between the pin 88 and the point of engagement of the pin 88 with the latch extension 90. In operation, after the predetermined time for which the mechanism has been set has elapsed, the pin 88 will engage the extension 90 to disengage the latch and permit the bread carrier 18 to be automatically elevated by the spring 48, the contacts 34, 36 being simultaneously separated to open the circuit to the heating elements 16. An advantage of employing an elongated spring 48 common to both the operating member 60 and the bread carrier support 20 is to obtain a less abrupt elevating movement of the bread carrier when the latch 62 is disengaged.

As shown in Fig. 5, the control knob 78 may be graduated for various degrees of light and dark toast, and in practice, one-half of the face of the control knob may be colored a light brown, and the other half may be colored a dark brown, as indicated.

While the preferred embodiment of the invention has been herein illustrated and described, it will be understood that the invention may be embodied in other forms within the scope of the following claims.

Having thus described the invention, what is claimed is:

1. In an automatic electric toaster having a frame, a movable bread carried normally urged into non-toasting position, means for retaining the carrier in toasting position, timing means arranged to disengage the retaining means to permit return of the carrier to non-toasting position after a predetermined time interval, an independently movable operating member normally urged into inoperative position and manually movable to engage and move the carrier into toasting position and for setting said timer, spring guiding means fixed in the upper portion of said frame, and an elongated spring looped over said guiding means and connected at one end to said bread carrier and at its other end to said independently movable operating member for returning the operating member to inoperative position after the carrier moving operation, and for returning the carrier to non-toasting position upon disengagement of the retaining means.

2. In an automatic electric toaster having a frame, a movable bread carrier normally urged into non-toasting position, a vertical rod supported in said frame, a slide member mounted on said rod for supporting said carrier, latch means directly engageable with the carrier for retaining the same in toasting position, timing means including a winding disk having means engageable with the latch to effect disengagement thereof after a selectively adjustable time has elapsed to permit return of the carrier to non-toasting position, a second slide comprising an operating member mounted on said rod normally urged into inoperative position and manually movable to engage the carrier slide to move the carrier into latched position, said second slide returning to inoperative position after the latching operation, a bar having a pin carried by and movable with said second slide and engageable with said disk for effecting winding of said timer, means for adjusting said bar in said second slide whereby to change the position of initial engagement of the pin with said disk when the operating member is moved through a fixed distance to effect different windings and different durations of operation of said timer, and a leaf spring arranged to bear against said bar to frictionally and resiliently retain the timer-winding bar and pin in its adjusted position relative to said second slide.

3. In an automatic electric toaster having a frame, a movable bread carrier normally urged into non-toasting position, a vertical rod supported in said frame, a slide member mounted on said rod for supporting said carrier, latch means directly engageable with the carrier for retaining the same in toasting position, timing means including a winding disk having means engageable with the latch to effect disengagement thereof after a selectively adjustable time has elapsed to permit return of the carrier to non-toasting position, a second slide comprising an operating member mounted on said rod normally urged into inoperative position and manually movable to engage the carrier slide to move the carrier into latched position, said second slide returning to inoperative position after the latching operation, a bar having a pin carried by and movable with said second slide and engageable with said disk for effecting winding of said timer means for adjusting said bar in said second slide whereby to change the position of initial engagement of the pin with said disk when the operating member is moved through a fixed distance to effect different windings and different durations of operation of said timer, a leaf spring arranged to bear against said bar to frictionally and resiliently retain the timer-winding bar and pin in its adjusted position relative to said second slide, spring guiding means fixed in the upper portion of said frame, an elongated spring looped over said guiding means and connected at one end to said bread-carrier slide and at its other end to said operating slide for returning the operating slide to inoperative position after the carrier-moving operation, and for returning the carrier to non-toasting position upon disengagement of said latch.

LUDWIG REICHOLD.

References Cited in the file of this patent

UNITED STATES PATENTS

| Number | Name | Date |
|---|---|---|
| 1,876,072 | Noonan | Sept. 6, 1932 |
| 2,129,360 | Purpura | Sept. 6, 1938 |
| 2,236,394 | Biebel | Mar. 25, 1941 |
| 2,236,395 | Biebel | Mar. 25, 1941 |
| 2,236,405 | Ireland | Mar. 25, 1941 |
| 2,361,078 | Anderson | Oct. 24, 1944 |
| 2,378,073 | Felver et al. | June 12, 1945 |
| 2,503,960 | McCullough | Apr. 11, 1950 |

FOREIGN PATENTS

| Number | Country | Date |
|---|---|---|
| 611,144 | Great Britain | Oct. 26, 1948 |